J. F. KOHLER.
MACHINE FOR MAKING RIMS FOR SOFT PIES.
APPLICATION FILED AUG. 5, 1907.

903,584.

Patented Nov. 10, 1908.
4 SHEETS—SHEET 1.

WITNESSES

INVENTOR
John F. Kohler
BY
ATTORNEYS

J. F. KOHLER.
MACHINE FOR MAKING RIMS FOR SOFT PIES.
APPLICATION FILED AUG. 5, 1907.

903,584.

Patented Nov. 10, 1908.
4 SHEETS—SHEET 2.

WITNESSES

INVENTOR
John F. Kohler
BY
ATTORNEYS

J. F. KOHLER.
MACHINE FOR MAKING RIMS FOR SOFT PIES.
APPLICATION FILED AUG. 5, 1907.

903,584.

Patented Nov. 10, 1908.
4 SHEETS—SHEET 3.

WITNESSES

INVENTOR
John F. Kohler
BY
ATTORNEYS

J. F. KOHLER.
MACHINE FOR MAKING RIMS FOR SOFT PIES.
APPLICATION FILED AUG. 5, 1907.
903,584.
Patented Nov. 10, 1908.
4 SHEETS—SHEET 4.
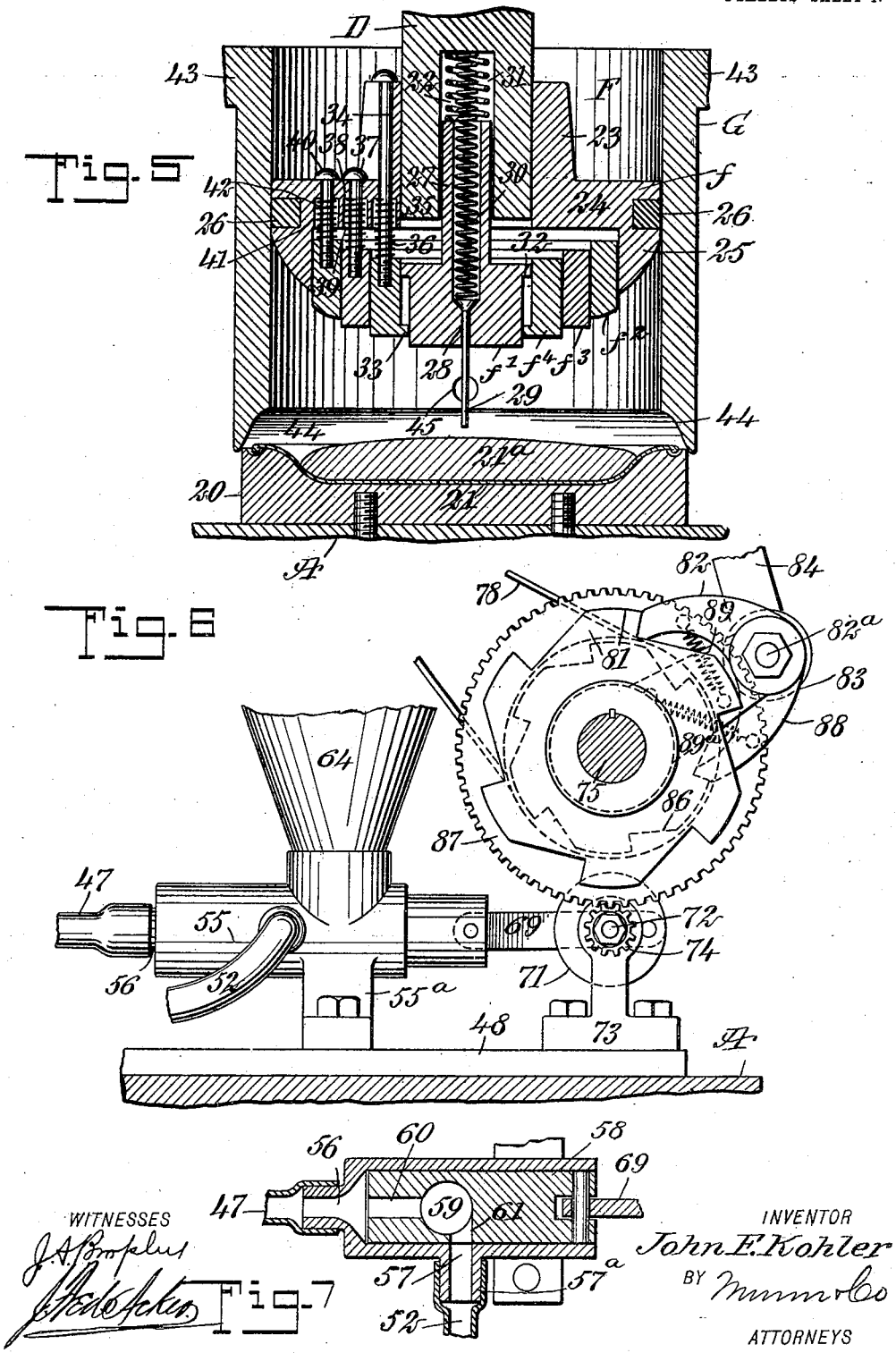
INVENTOR
John F. Kohler
BY Munn & Co
ATTORNEYS
WITNESSES

UNITED STATES PATENT OFFICE.

JOHN F. KOHLER, OF NEW YORK, N. Y.

MACHINE FOR MAKING RIMS FOR SOFT PIES.

No. 903,584.      Specification of Letters Patent.      Patented Nov. 10, 1908.

Application filed August 5, 1907. Serial No. 387,153.

*To all whom it may concern:*

Be it known that I, JOHN F. KOHLER, a citizen of the United States, and a resident of the city of New York, borough of Manhattan, in the county and State of New York, have invented a new and useful Improvement in Machines for Making Rims for Soft Pies, of which the following is a full, clear, and exact description.
The purpose of the invention is to provide a machine of very simple, effective, and durable construction, which will automatically press dough fed thereto in rims in pie plates, said rims being especially adapted to receive the filling of soft pies.

It is also a purpose of the invention to provide a special type of head for such work constructed in annular sections, which sections act upon the dough consecutively from the inner outwardly, as the head is brought into shaping position, automatically releasing the pressed dough in reverse order as the head rises, thus insuring the pie plate remaining in position during both of said operations, and the dough remaining upon the plate.

It is a further purpose of the invention to provide a means for automatically dusting flour upon the dough and pie plate prior to each pressing operation of the head, insuring a perfect operation of the ring sections of the head, while compressing the dough, and a cleanly release of the head from the dough as the head is withdrawn from the finished rim.

Figure 1:
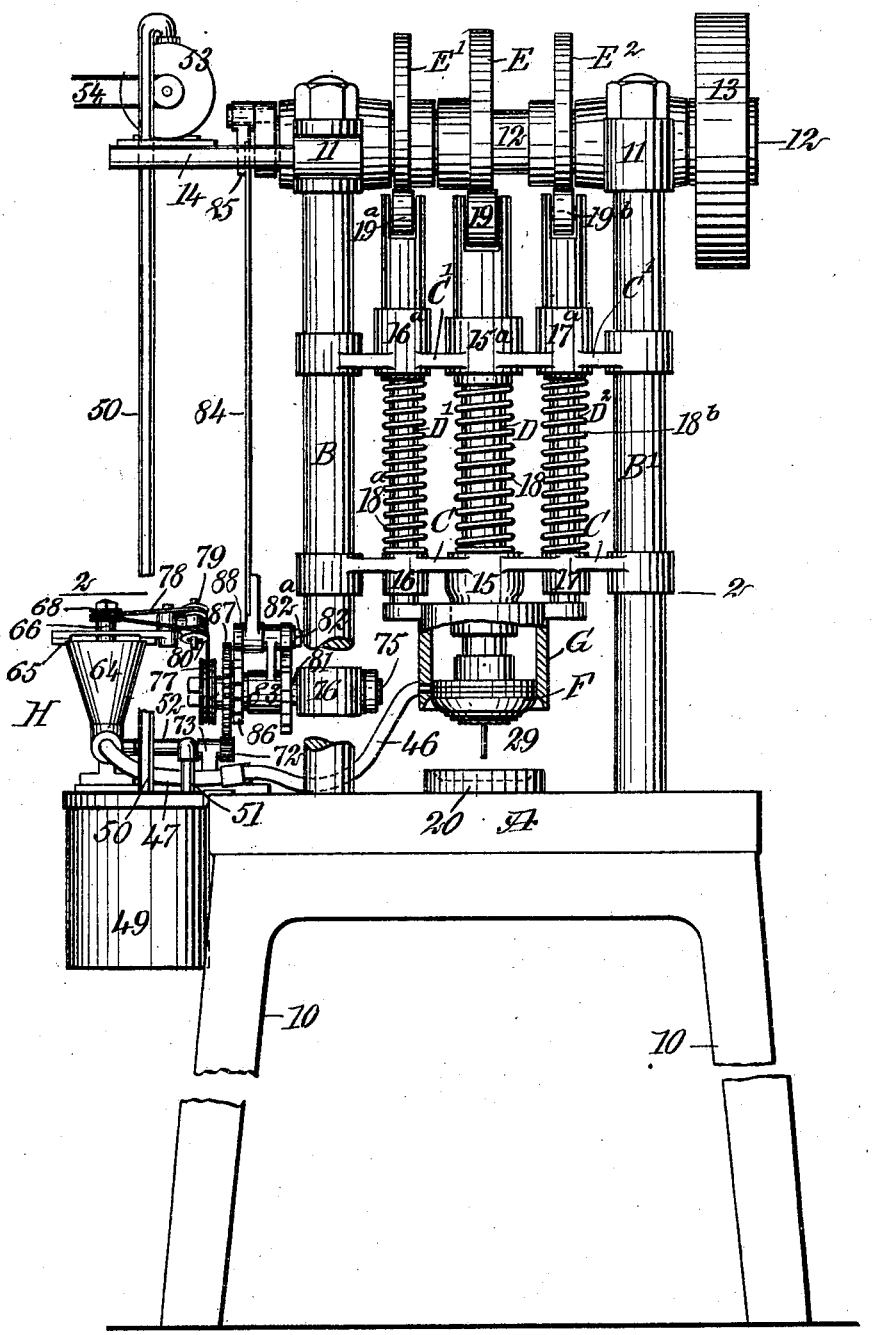
Figure 2:
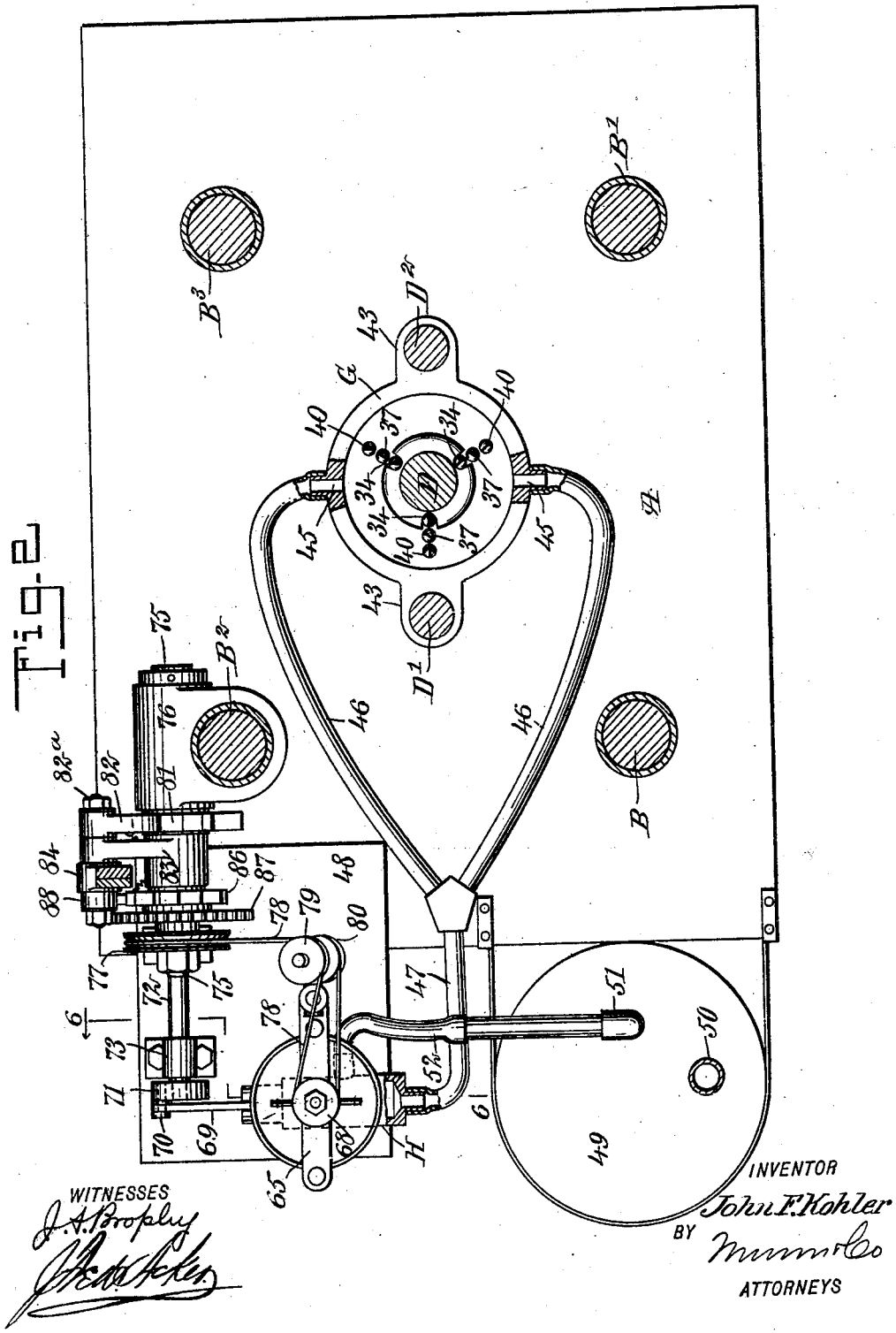
Figure 3:
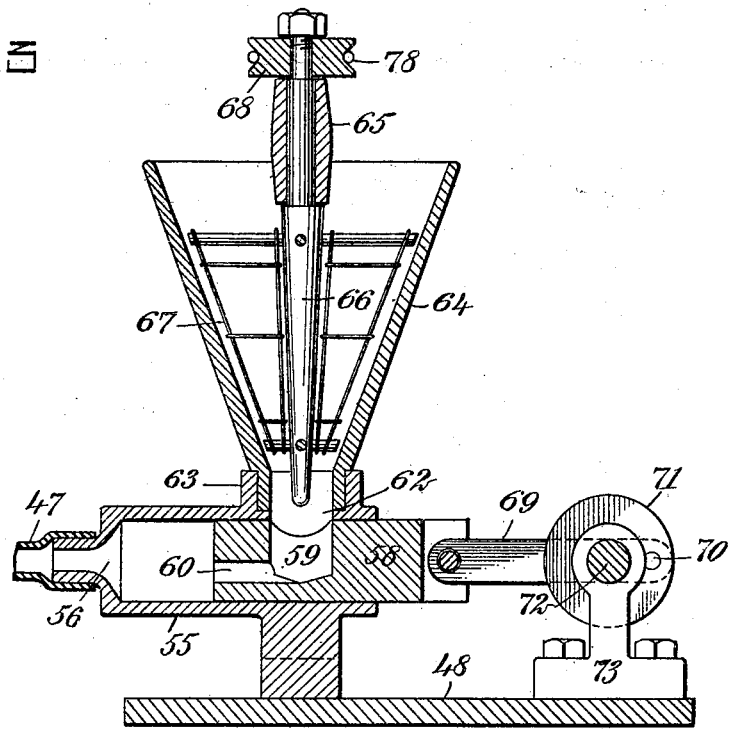
Figure 4:
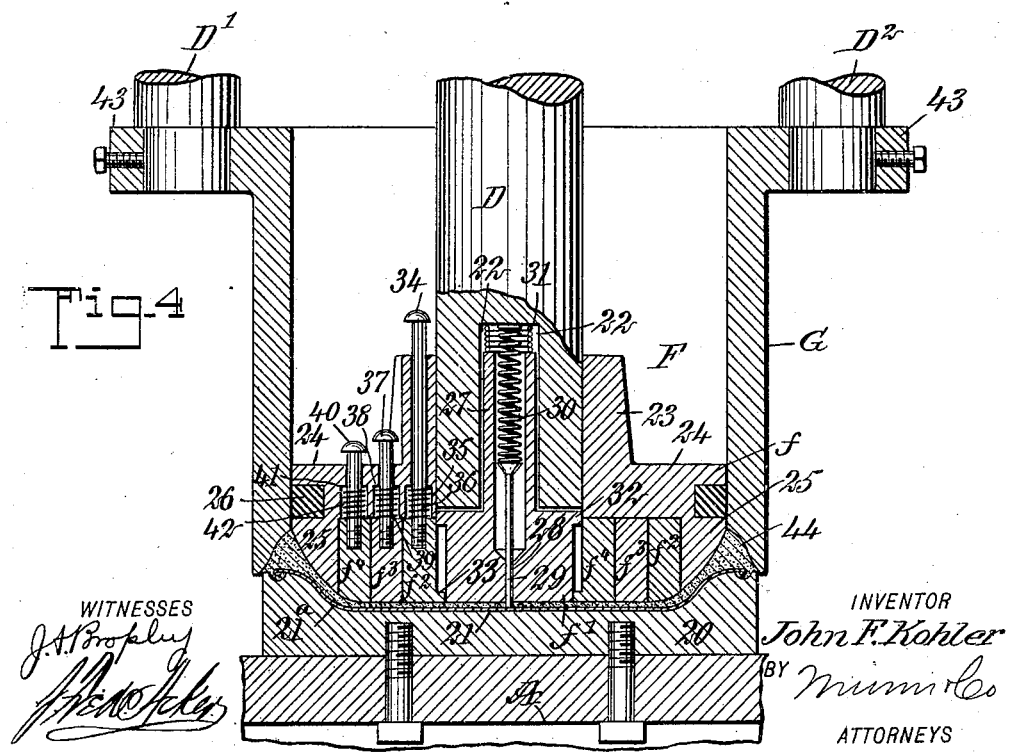

The invention consists in the novel construction and combination of the several parts as will be hereinafter fully set forth and pointed out in the claims.
Figure 1 is a front elevation of the machine; Fig. 2 is an enlarged horizontal section taken practically on the line 2—2 of Fig. 1; Fig. 3 is an enlarged vertical section through the flour sprinkling mechanism, the valve being shown in receiving position; Fig. 4 is an enlarged vertical section through a portion of the pie plate support and pie plate, and is also a vertical section through the head and encircling jacket, illustrating the head as just having finished the formation of a rim of dough upon the pie plate; Fig. 5 is a view similar to that shown in Fig. 4, but illustrating the position of the parts just prior to the action of the head upon the dough; Fig. 6 is an enlarged detail vertical section of the flour sprinkling mechanism, the section being taken practically on the line 6—6 of Fig. 2; and Fig. 7 is a horizontal section through the flour sprinkling mechanism and its casing, the valve being shown in discharge position.

A represents the bed or table of the machine supported by legs 10, or the equivalents thereof, and four columns extend vertically upward from the bed, two front columns B and B', and two rear columns $B^2$ and $B^a$, and the said columns are connected at the side portion of the machine at their upper ends by cross bars 11, and at the central portions of the said cross bars 11, bearings are provided for a drive shaft 12 that is provided with a suitable driving pulley 13, and at the outer left hand portion of the left cross bar 11 an outwardly extending horizontal partition or auxiliary table 14 is provided. The four columns above mentioned serve as supports for two horizontal skeleton partitions C and C' located one at each side of the center of the structure, and the said partitions C and C' are so formed that each is provided with three bearings located centrally with respect to the said columns; the bearings for the lower partition C consist of a central one 15, and bearings 16 and 17 at opposite sides of the central one, while the corresponding bearings formed in the upper partition C' are designated respectively as $15^a$, $16^a$, and $17^a$.

Plungers are provided for the bearings in the two partitions C and C'; these plungers are designated as D, D', and $D^2$. The plunger D is a central or main plunger and has movement in the bearings 15 and $15^a$; the plunger D' has movement in the bearings 16 and $16^a$, while the corresponding plunger $D^2$ has movement in the bearings 17 and $17^a$. A spring 18 is coiled around the central plunger D between its bearings, and a similar spring $18^a$ is provided for the plunger D', while a like spring $18^b$ is provided for the plunger $D^2$, and these springs are placed under compression when the plungers are carried downward and act to raise the plungers when relieved from pressure at their upper ends. A friction roller 19 is mounted to revolve in the upper end of the main plunger D, and the plunger D' is provided with a similarly located friction roller $19^a$, while a roller $19^b$ is also provided for the plunger $D^2$. Each of the friction rollers just mentioned is adapted to be engaged by a cam, and these cams are mounted on the drive shaft 12. The cam for the main plunger D is designated as E, that for the plunger D' as E', and that for the plunger D² as E². These cams are suitably shaped to provide for the downward movement of the plungers in the required order, and to permit of the upward movement of said plungers at suitable times.

A shaping head F is secured to the lower end of the central plunger D, and immediately below the said shaping head a pie plate support 20 is bolted to the bed A, its upper face being suitably shaped to receive a pie plate 21, as is illustrated in Figs. 4 and 5. The pie plate support 20 is of such dimensions that it extends slightly beyond the edge of the pie plate, as is also best shown in Fig. 5.

At the lower end of the main plunger D a vertical chamber 22 is formed, and the shaping head F is secured in any suitable or approved manner to the chambered portion of the plunger D, and the said shaping head F is of the following construction, namely: A circular body section $f$ is provided, which embraces a hub member 23, a horizontal member 24 extending from the hub member, and a marginal flange member 25, the lower outer edge portion of which member 25 is curved more or less downwardly and inwardly, while the inner end of the said member 25 is straight, and a packing ring 26 is usually inserted in the outer portion of the flange member of the said body section $f$. The other sections of the shaping head are nested within the body section $f$ and consist, firstly, of a central circular block section $f'$, that is provided with a tubular stem 27 which extends up into the chamber 22 of the said main plunger D. The said central block section $f'$ is provided with a continuation of the stem 27, which continuation is designated as 28 and is reduced in diameter, as is particularly shown in Figs. 4 and 5. This reduced continuation 28 is adapted to receive a centering pin 29, that extends normally some distance below the under face of the said block section, as is shown in Fig. 5, but which may be forced up within said block section when the shaping head is in action, as is shown in Fig. 4. A spring 30 bears upon the head of the centering pin 29, keeping it in its said normal position, and this spring extends up through the stem 27 of the said block $f'$ to have bearing against the end of the chamber 22 of the plunger D, and furthermore, a stouter and shorter spring 31 is also located within the said chamber 22, having bearing at one end against the walls of the said chamber, and at the other end against the stem 27, the spring 31 tending to normally force the said block section $f'$ downward. The remaining sections located within the boundaries of the flange 25 of the body section $f'$, and which surround the central block $f'$, are designated respectively, the outer section as $f^2$, the intermediate section as $f^3$, and the inner section as $f^4$; these intermediate sections are ring sections and are nested one within the other. The under faces of the ring sections $f^4$ and $f^3$ are flat, while the under face of the outermost intermediate ring section $f^2$ is more or less curved, since the bottom portion of the shaping head F is substantially convexed for ordinary purposes, but it may be so shaped as to produce any desired form of rim that may be needed.

The central block section $f'$ is limited in its downward movement by forming at its upper edge a flange 32 that engages with a flange 33 at the inner face of the innermost intermediate ring section $f^4$. The intermediate ring sections of the shaping head are supported in the following manner: usually three bolts 34 are passed down through the member 23 of the body section $f$ and through an annular chamber 35 produced in the bottom of the horizontal portion 24 of the said body section, and the lower ends of the bolts 34 which are threaded, are tapped in the innermost ring section $f^4$, and a spring 36 is coiled around each of said bolts 34, which springs rest against the upper face of the said ring section $f^4$ and the upper wall of the chamber 35. The next ring section $f^3$ is supported by bolts 37 that pass through the horizontal member 24 of the shaping head F and through a chamber 38 also formed in the under face of the horizontal portion 24 of the body section $f$, and the lower ends of the bolts 37 are tapped in the upper portion of the ring section $f^3$ and are surrounded by springs 39 that extend into the chamber 38 and have bearing against the upper face of the said section $f^3$. The outermost ring section $f^2$ is similarly supported preferably by three bolts 40 that likewise pass through the body $f$ and through a recess 41 in its under face, and are then tapped into the said section $f^2$, and the bolts 40 are surrounded by springs 42 that extend into the chamber 41 and have bearing on the said ring $f'$, as is best shown in Figs. 4 and 5. The springs provided for the bolts 34, 37, and 40, tend to normally force the sections connected therewith downwardly, as is illustrated in Fig. 5, and the said bolts have free movement in the horizontal member 24 of the ring body $f$, and each group of bolts is in transverse alinement, as is best shown in Fig. 2.

The shaping head F is adapted for movement in a cylindrical jacket G, and this jacket is provided with opposing ears 43 at its upper edge, said ears being secured in any suitable or approved manner to the plungers D' and D². The jacket G is more or less curved at the inner portion of its lower edge, as is shown at 44 in Figs. 4 and 5, and the lower edge of the jacket G, when the latter is in its lowest position, has bearing against the upper marginal portion of the pie plate support 20, forming thereby a temporary chamber around the pie plate 21, and the dough 21ª placed thereon. The jacket G is preferably provided with opposing openings 45, shown best in Fig. 2, and at these openings 45 the outer ends of pipes 46 are introduced, and the said pipes 46 are brought together and are connected with a main pipe 47. Flour is forced through the pipes 46 and 47 into the jacket G as soon as it is in the lowest position, so as to dust the dough to be pressed, and the shaping surface of the head.

At the rear left-hand corner of the table A a shelf 48 is located, and at the left-hand forward portion of the said table a tank 49 is suitably supported, adapted to contain compressed air; the compressed air is conveyed to the tank 49 through a pipe 50, that is carried upward, as is shown in Fig. 1, and is connected with an air compressor 53, located on the shelf or projection from the upper portion of the frame, and this air compressor is connected by a belt 54 with any approved driving mechanism. An outlet pipe 51 is provided for the compressed air tank 49, and preferably a flexible pipe 52 is connected with the said outlet pipe, as is shown in Fig. 2. The pipes 46, 47, 51 and 52 are adapted for use in connection with a flour sprinkling or spraying mechanism H, shown particularly in Figs. 2, 3, 6 and 7. This mechanism consists of a cylindrical body 55, attached by means of suitable brackets 55ª to the extension 48 from the table A, and this cylindrical body 55 is provided at what may be termed its valve end with a nozzle 56, in direct connection with its interior, as is illustrated in Fig. 7, and the pipe 47 is connected with said nozzle. An opening 57 is made in the side of the cylindrical body 55, as is also shown in Fig. 7, and this opening 57 is surrounded by a collar 57ª and this collar receives the end of the pipe 52 that leads from the compressed air tank 49.

A valve 58 is mounted to slide in the cylindrical body 55 to and from the end with which the pipe 47 is connected, and this valve is provided with a recess 59 in its upper face which acts as a pocket to receive flour from a source to be hereinafter mentioned. A port 60 extends from the pocket 59 out through that end of the valve that faces the outer end of the cylindrical body, as is shown in Figs. 3 and 7, and a second port 61 is carried from the pocket 59 out through the left side of the valve that faces the side of the cylinder in which the inlet opening 57 is produced, and in the top portion of the cylindrical body 55 an opening 62 is made that is surrounded by a collar 63, and in this collar around the said opening 62 the lower end of a hopper 64 is introduced. This hopper is provided at the top with a cross bar 65 attached thereto in any approved manner, and this cross bar 65 serves as a bearing for the upper end of an agitating shaft 66 that extends down through the hopper almost to the pocket 59 in the valve, as is shown in Fig. 3, and the said agitating shaft 66 is provided with skeleton arms 67 extending outwardly therefrom, practically conforming to the interior of the hopper, which arms serve to break up lumps of flour as the said shaft 66 is operated.

When the valve 58 is to receive a charge of flour, it is at the limit of its outward stroke and occupies the position shown in Fig. 3, and at such time the port 57 in the side of the valve cylinder is closed, and when the said valve is forced inward after having been charged it assumes the position shown in Fig. 7, wherein the port 61 in the valve is brought in registry with the air receiving port 57 in the casing 55, and the air from the tank 49 will thereupon rush into the pocket 59 and drive the flour out therefrom into the tubes 46, 47, and from thence into the jacket over the dough in the plate. The movement of the valve 58 is accomplished as follows: A link 69 is attached to the rear end of the said valve and this link is pivotally connected by a wrist pin or its equivalent 70 to a disk 71 located on a shaft 72 mounted to turn in suitable bearings 73 that are located on the table extension 48 adjacent the rear edge thereof, and at the inner or right-hand end of the shaft 72 a pinion 74 is secured, as is illustrated in Fig. 6. A shaft 75 is located above the shaft 72, being mounted to turn in a bearing 76 carried at the lower portion of the upright column B², as is illustrated in Fig. 2. At the outer end of the shaft 75 a preferably grooved pulley 77 is secured, and a belt 78 is passed over the said pulley 77 and in engagement with two pulleys 79 and 80 located one above the other, being mounted to turn at the inner end of the cross bar 65 for the hopper, as is shown in Figs. 1 and 2, and the said belt 78 is finally passed around the pulley 68 on the shaft 66. The shaft 75 is turned through the medium of a ratchet wheel 81 which is secured to the shaft adjacent its bearing 76, as is shown in Figs. 2 and 6, and this ratchet wheel 81 is engaged by an upwardly and forwardly extending dog 82 that is loosely mounted on a shaft 82ª mounted in a rocker arm 83, which in its turn is loosely mounted on the shaft 75, and this rocker arm 83 is connected by an attachment 84 with a crank 85 located on the main shaft 12, as is illustrated in Fig. 1. A second ratchet wheel 86 is loosely mounted on the shaft 75 and this ratchet wheel 86 is fast to the head of a gear 87 likewise loosely mounted on the shaft 75, which gear 87 meshes with the pinion 74 on the lower shaft 70, as is shown in Fig. 6, and the ratchet wheel 86 is engaged by a downwardly and forwardly extending dog 88 also loosely mounted on the aforesaid shaft 82ᵃ. When the dog 82 operates, it turns the shaft 75 and thus imparts motion to the agitating device in the hopper, and when the gear 87 is in action, it turns the shaft 72 to operate the valve 58, and one shaft alternates with the other in its movements.

Supposing the jacket G to have approached its lower position, the valve will be in its discharge position shown in Fig. 7, and the compressed air will cause the flour to be sprinkled within the said jacket prior to the descent of the shaping head; as the shaping head and its jacket G ascend at the downward movement of the attachment 84, the ratchet wheel 86 will be operated and the valve 58 will be drawn to its receiving position shown in Figs. 2 and 3, and also during the outward movement of the head and its jacket and at the upward stroke of the attachment 84, the ratchet wheel 81 will be brought into action and the spraying device will be set in motion, so that the flour will freely travel down into the pocket of the valve, so that when the jacket again approaches its lower position, shown in Fig. 5, the ratchet wheel 86 will be again brought into action at the down stroke of the attachment 84, and the valve will be again carried to its discharge position.

With reference to the movement of the jacket and the shaping head; as the main shaft 12 revolves, the cams E' and E² first operate upon the plungers D' and D² to force them downward and shortly afterward the cam E acts upon the main plunger D to carry it down. All of the plungers travel at about the same speed, thus the jacket G and the plate support 20 are in advance of the shaping head, reaching the dough 21ᵃ on the plate 21 first, and at this time, as has been stated, the dough is dusted with flour. As the shaping head reaches its lower position, the centering pin 29 will pass through the center of the body of dough and engage with the central portion of the plate, holding the plate in position on its support, thus upon the continued downward movement of the shaping head the central block section $f$ will engage with the central portion of the mass of dough and force it out, then the next ring section $f^4$ will be brought in engagement with the dough, forcing it still further outward, then the other section $f^3$ is brought into action continuing the outward forcing of the dough in the direction of the edge of the plate, then the outermost ring section $f^2$ is brought into action, which engages with the dough just where the bottom of the plate connects with its side portion. This compressing action of the parts named is gradual yet decided, and finally upon a still further downward movement of the main plunger D' the body section $f$ of the said shaping head F is brought in engagement with the dough at the side of the plate, forcing it outward to the edge thereof, as is shown in Fig. 4, at which time all of the ring sections inclosed by the body section $f$ will be in engagement with the under face of its horizontal member 24, and the bottom of the head will have a corresponding contour to that of the upper face of the pie plate, as is illustrated in Fig. 4. Upon the continued movement of the main plunger 12 the pressure of the plungers is gradually relieved by the action of the cams causing the springs around said plungers to be brought in action and to travel upward with substantially the same speed, but the shaping head moves up slightly in advance of the jacket G and the sections of the body are released from the shaped dough one after the other from the outside in direction of the center, the central section $f''$ being the last to leave the shaped dough, except that the centering pin 29 continues to have bearing on the pie plate until all of the sections of the shaping head have released themselves, and their controlling springs have forced them all down to the normal positions shown in Fig. 5.

This device is exceedingly simple in its character and is very positive in its action, and expeditiously and perfectly performs its work, making a true and even rim, and providing means for preventing the dough from sticking to the head or the possibility of the plate being taken up with the head.

Having thus described my invention, I claim as new and desire to secure by Letters Patent,—

1. In machines for making rims for soft pies, a shaping head, a jacket inclosing the head, a support for the pie plate, means for moving the jacket into contact with the support whereby to form a chamber, means for operating the shaping head, and means for spraying flour into the jacket previous to the operation of the shaping head.

2. In machines for making rims for soft pies, a shaping head, comprising a series of nested ring members, a jacket inclosing the head, a support for the plate, means for moving the jacket into contact with the support to form a chamber, means for operating the shaping head, and means for spraying flour into the jacket before the operation of the shaping head.

3. In a machine for making rims for soft pies, a shaping head, composed of a series of nested ring members, yielding means for individually supporting said members, a jacket inclosing the shaping head, means for moving the jacket into contact with the support to form a chamber, means for operating the shaping head, and means for spraying flour into the jacket before the operation of the shaping head.

4. In machines for making rims for soft pies, a shaping head, a jacket therefor, independent means for imparting vertical movement to the head and the jacket in the same direction and substantially at the same time, a source of compressed air supply, a source of flour supply, connections between the source of air supply and the source of flour supply, and connections between the source of flour supply and the interior of said jacket.

5. In machines for making rims for soft pies, a shaping head, a jacket therefor, means for independently moving the jacket and head in concert and in the same direction, a source of compressed air supply, a source of flour supply, tubular connections between the source of air and the source of flour supply, and tubular connections between the flour supply and the inside of the jacket, and means for alternately cutting off the feed of flour to the said jacket and of admitting a feed thereto, as described.

6. In a machine for making rims for soft pies, a shaping head, a jacket therefor, means for independently moving the jacket and head in concert and in the same direction, a hopper for flour, a receiver for flour connected with the said hopper, a controlling valve for the flour supply located in said receiver, a source of compressed air supply connected with the said receiver and adapted for connection with ports in the said valve, a connection between the receiver for the flour and the interior of the jacket, and means for alternately operating the said valve.

7. In a machine for making rims for soft pies, a shaping head, a jacket therefor, means for independently moving the jacket and head in concert in the same direction, a source of compressed air supply, a cylinder provided with an outlet at one of its ends and an inlet in its side connected with the source of air supply, a valve mounted to slide in the said cylinder, provided with a pocket for the reception of flour, and ports connected with said pockets, one of which ports is adapted for connection with the delivery end of the cylinder, the other port being adapted when the valve is in closed position to register with the side port of the cylinder, a tubular connection between the outlet of the cylinder and the interior of the said jacket, a hopper connected with the cylinder and adapted to deliver flour to the ports in said valve, an agitator for the said hopper, and means for alternately operating the said valve to an open and closed position and for operating the said agitating device.

In testimony whereof I have signed my name to this specification in the presence of two subscribing witnesses.

JOHN F. KOHLER.

Witnesses:
J. FRED ACKER,
JOHN P. DAVIS.